United States Patent [19]

Thiel et al.

[11] Patent Number: 4,856,620

[45] Date of Patent: Aug. 15, 1989

[54] SPOT-TYPE DISC BRAKE

[75] Inventors: Rudolf Thiel, Frankfurt am Main; Ulrich Klimt, Gross-Umstadt; Helmut Kast, Frankfurt am Main, all of Fed. Rep. of Germany

[73] Assignee: Alfred Teves GmbH, Frankfurt am Main, Fed. Rep. of Germany

[21] Appl. No.: 717,445

[22] Filed: Mar. 29, 1985

[30] Foreign Application Priority Data

Mar. 31, 1984 [DE] Fed. Rep. of Germany ....... 3412062

[51] Int. Cl.$^4$ ............................................ F16D 65/02
[52] U.S. Cl. ................................ 188/72.4; 188/73.39; 188/73.45; 188/217
[58] Field of Search ................. 188/72.4, 73.39, 73.45, 188/206 R, 217

[56] References Cited

U.S. PATENT DOCUMENTS

| 3,376,955 | 4/1968 | Kamps et al. | 188/72.4 |
| 4,533,025 | 8/1985 | Carre | 188/73.39 X |

FOREIGN PATENT DOCUMENTS

| 3346629 | 7/1985 | Fed. Rep. of Germany . |
| 2272298 | 12/1975 | France . |
| 2316478 | 1/1977 | France . |
| 2532703 | 3/1984 | France . |
| 2537229 | 6/1984 | France . |
| 58-50329 | 3/1983 | Japan ............................. 188/73.45 |

Primary Examiner—Douglas C. Butler
Attorney, Agent, or Firm—Robert P. Seitter

[57] ABSTRACT

A spot-type disc brake comprises a brake support member and a brake caliper guided via pins mounted in the brake support member. The brake caliper pressurizes the brake shoes arranged on either side of a brake disc by virtue of a brake piston on a bore. The brake shoe lying opposite to the piston is supported on the end face in the brake caliper, while the other brake shoe bears against the end face in the brake support member. To prevent inclined positioning of the brake caliper which results in tapered wear at the brake shoes, the retaining arm arranged in the brake disc's direction of rotation at the brake disc exit is dimensioned such in cross-section that its deformation in the circumferential direction of the brake disc will not be much larger than the fit clearance available between the brake piston and the bore.

4 Claims, 2 Drawing Sheets

SPOT-TYPE DISC BRAKE

BACKGROUND OF THE INVENTION

The present invention relates to a spot-type disc brake for automotive vehicles. A brake support member is fixed to the axle of the vehicle, and a brake caliper is guided through pins affixed to the brake support member. The brake caliper transmits force to the brake shoes arranged on either side of a brake disc by virtue of a piston in a bore. The brake shoe adjacent the piston is supported directly on the brake support member via retaining arms, and the brake shoe opposite the piston bears against the brake caliper.

One known spot-type disc brake is described in German patent application P No. 33 46 629. This spot-type disc brake has the disadvantage that tangential tapered wear occurs at the brake shoes during service which is caused in particular by the deformations at the brake support member during braking operation due to the circumferential force acting on the support member.

It is therefore an object of the present invention to provide a spot-type disc brake in which no appreciable tapered wear occurs.

SUMMARY OF THE INVENTION

The present invention provides an improved disc brake wherein, during braking in forward travel of the vehicle, the retaining arm arranged in the brake disc's direction of rotation at the brake disc exit is dimensioned in its cross-section that its elastic deformation in circumferential direction of the brake disc is less than, or equal to, the fit clearance available between the piston and the bore.

The circumferential force occurring at the piston-side brake shoe during the braking operation will be received completely by the retaining arm of the brake support member in the direction of rotation of the brake disc at the exit thereof. This inventive measure assures that, due to the reinforcement of the retaining arm of the brake support member at the brake disc exit, the elastic deformation of the retaining arm during braking will be reduced. The displacement of the piston-side brake shoe in the disc's direction of rotation will decrease to the same extent. However, as the clamping force acting during braking from the piston onto the brake shoe brings about frictional engagement between the piston and the brake shoe, the piston will displace less far in the disc's direction of rotation because of less deformation of the retaining arm at the disc exit. This smaller displacement travel is compensated because of the fit clearance available between the piston and the bore so that no force component of the circumferential force will be transmitted from the brake shoe via the piston and the brake caliper to the pin on the disc entry side. Thus, only that circumferential force that results at the brake shoe opposite to the piston will act on the pin. This inventive arrangement relieves and pin guide from load, in consequence whereof lower bending forces are applied on the pin. This results in less pin deformations and reduces the degree of inclined positioning of the brake caliper, whereby tapered wear of the brake shoes will be reduced.

As experience has shown, approximately 80% of all braking operations of a vehicle are performed with deceleration values of less than 30% of maximum. In order to reduce tapered wear of the brake lining of the brake shoe in this operating range, according to the present invention, the displacement travel occurring at the retaining arm in the presence of these low deceleration values will be adapted to the fit clearance between the piston and the cylinder bore in the brake caliper. It will then be possible on occurrence of higher deceleration values to transmit a force component from the piston onto the caliper.

DESCRIPTION OF THE PREFERRED EMBODIMENT

Figure 1:
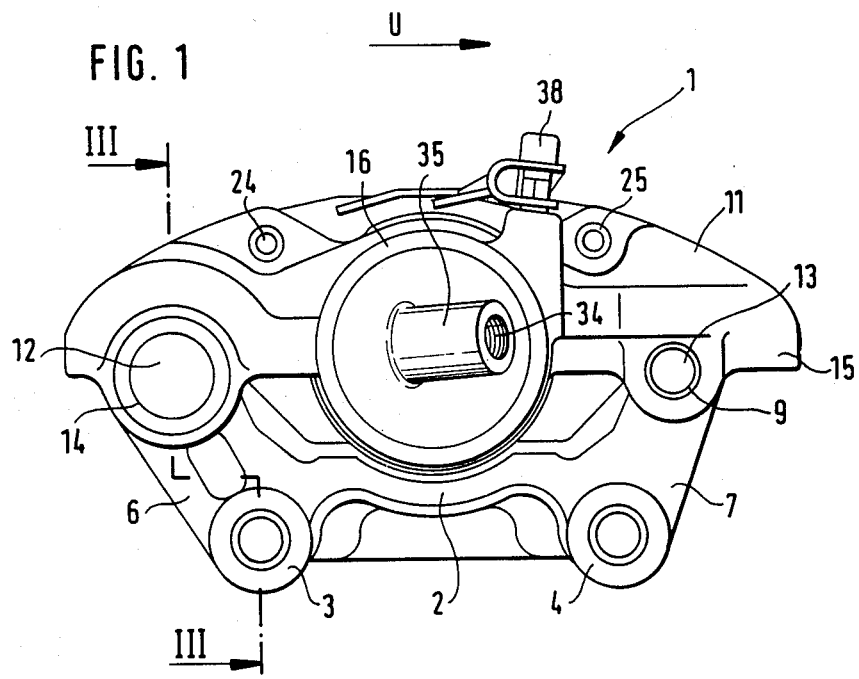
FIG. 1 is a front view of a spot-type disc brake according to the present invention.
Figure 2:
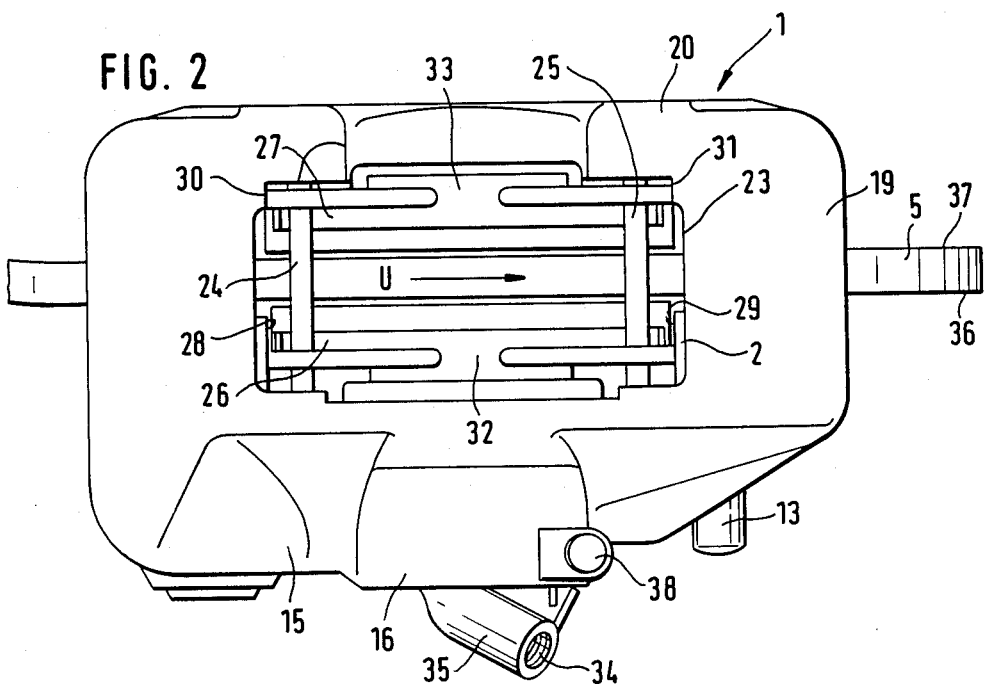
FIG. 2 is a top plan view of the spot-type disc brake of FIG. 1.
Figure 3:
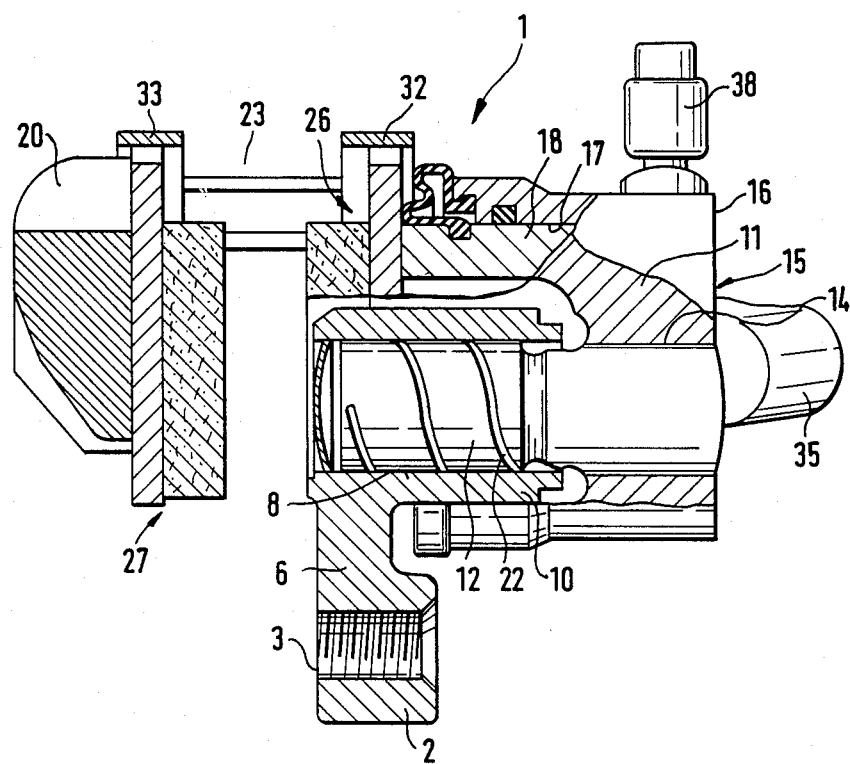
FIG. 3 is a cross-section of this spot-type disc brake taken along the line III—III in FIG. 1.

The spot-type disc brake 1 illustrated in FIGS. 1 through 3 of the drawings is mounted on an automotive vehicle. It comprises a brake support member 2 which is adapted to be screwed, bolted or otherwise fastened to a steering knuckle, axle or any other component part of the wheel suspension of an automotive vehicle (not shown) at the side of brake disc 5 by means of mounting eyes 3, 4.

Brake support member 2 is formed with two retaining arms 6, 7 arranged substantially in V-type configuration having generally rectangular cross-sections and containing bores 8, 9 at their radially outer ends. Bore 9 is not disposed in the drawing plane in FIG. 1. Bore 8 in the retaining arm 6 is located in an axially extending attachment 10 at the outer end of retaining arm 6. Bore 8 axially slidably accommodates a pin 12 fitted to a brake caliper 11, as will be described in more detail hereinbelow. Secured in the other bore 9 of the retaining arm 7 is an axially extending and axially slidable guide pin 13. Pin 13 is pressed and caulked in to the bore 9 at the brake support member 2 and is thus frictionally and positively engaged therewith. Pin 13 guides brake caliper 11 at the area of the bridge portion 19 in a sliding manner. In consequence thereof, very close tolerances are required for the pin guide. The pin guide system in spot-type disc brake 1 can likewise be arranged such that the one end of pin 12 is supported stationarily in bore 8 of the brake support member 2, while the other end thereof is axially slidably guided in bore 14 in brake caliper 11.

Brake caliper 11 is of substantially frame-like design and comprises a first radially extending leg 15 which forms a brake cylinder 16 receiving brake piston 18 that is axially slidable in cylinder bore 17. Adjacent to leg 15 is bridge portion 19 which straddles brake disc 5 at its outer periphery. On the other side, bridge portion 19 passes over into another leg 20 extending radially to the brake center. The free end of pin 12 is provided with a spirally circumferential lubricating groove 22. The dimensioning of the diameter of pin 12 in respect of that of bore 8 is chosen such that said pin 12 forms a fixed bearing in conjunction with bore 8.

Bridge portion 19 contains an aperture 23 in its midsection which is penetrated by retaining pins 24, 25 that are guided and fastened in two legs 15, 20 and wherein brake shoes 26, 27 are accommodated via retaining pins 24, 25. Brake shoe 26 bears directly against end faces 28, 29 in the brake support member 2; brake shoe 27 bears against end faces 30, 31 at leg 20 in brake caliper 11. Brake shoes 26, 27 are supported in a vibrationless manner via leaf springs 32, 33 taking support on retaining pins 24, 25.

A pressure connecting socket 35 provided with internal thread 34 for a pressure line (not illustrated) serves for hydraulic pressurization. Bleeder screw 38 serves for bleeding of the hydraulic system of spot-type disc brake 1.

The mode of function of this invention will now be explained in more detail with reference to the accompanying drawings.

During forward travel of a vehicle, the direction of rotation of the brake disc 5 is according to the circumferential direction U in FIGS. 1 and 2. On commencement of a braking operation, that is to say, on pressurization of brake piston 18, brake piston 18 will move to the left according to FIG. 3. Brake shoe 26 will be urged against brake disc 5 directly by brake piston 18. Brake shoe 27 will likewise be urged against brake disc 5 in consequence of the reaction force acting upon brake caliper 11, which force in turn causes displacement of brake caliper 11 on pin 12 and guide pin 13 to the right. The friction force occurring between brake shoes 26 and 27 and rotating brake disc 5 on account of the clamping force of brake piston 18 generates a circumferential force which has as an effect that brake shoe 26 moves into abutment on end face 29 of brake support member 2 and brake shoe 27 moves into abutment on end face 31 of brake caliper 11.

The circumferential force introduced at end face 29 will be transmitted directly from brake support member 2 onto the steering knuckle of an automotive vehicle. The circumferential force occurring at end face 31 will be transmitted via bridge portions 19 to leg 15 of brake caliper 11. From leg 15, the circumferential force will be transmitted via the wall of bore 14 onto pin 12. Pin 12 directs the circumferential force via the wall of bore 8 into brake support member 2. From there, the force will likewise be introduced into the steering knuckle.

The clamping force generated by brake piston 18 dependent upon the hydraulic pressure causes a corresponding frictional engagement between brake piston 18 and brake shoe 26. If the circumferential force U occurring at end face 29 is as high as to cause elastic deformation of retaining arm 7 in circumferential direction U, said deformation requires brake shoe 26 to likewise perform this travel. However, since there is frictional engagement between brake piston 18 and brake shoe 26 owing to the clamping force, brake piston 18 will follow the movement of brake shoe 26. If the expansion of retaining arm 7 is less than the fit clearance between brake piston 18 and cylinder bore 17, no circumferential forces will be transmitted according to the present invention via brake piston 18 onto brake caliper 11, since the circumferential force occurring at brake shoe 26 will now be directed in its full extent via end face 29 into brake support member 2.

Thereby, pin 12 is required to transmit only the circumferential force generated by brake shoe 27 onto brake support member 2. Owing to this minor load on pin 12, while sized alike, unacceptably high bending forces and thus unwanted deformations at pin 12 will be prevented. Furthermore, canting of pin 12 will be avoided so that brake caliper 11 is enabled to slide more easily in bore 8 of brake support member 2.

As the extent of inclined positioning of brake caliper 11 is substantially depending on the deformation of pin 12, the bending load on said pin 12 will be reduced by reinforcement of the material that retaining arm 7 is made of. The reduced bending deformation of pin 12 occurring hereby also causes less inclination of brake caliper 11 in relation to friction surfaces 36, 37 of brake disc 5. As again the mounting position of brake shoes 26, 27 is substantially dependent on the mounting position of brake caliper 11, the present invention arranges for brake shoes 26, 27 to be located permanently in parallel to friction surfaces 36, 37 of brake disc 5 during braking, as a result whereof tangential tapered wear on brake shoes 26, 27 is reduced.

What is claimed is:

1. A spot-type disc brake, comprising a brake support member including a pair of spaced apart retaining arms one arm disposed at a brake disc entrance end of said support member with respect to a main forward direction of rotation of said brake disc and the second retaining arm disposed at a brake disc exit end of said support member, a pair of guide pins one fixed in each of said retaining arms, a brake caliper having a pair of openings, each of said pins slidably guided in one of said openings, a piston slidably sealingly disposed in a bore in said brake caliper with a predetermined clearance fit between said piston and said bore, two brake shoes disposed on opposite sides of said brake disc, one brake shoe being adjacent to the piston and frictionally engaging said piston in clamping relationship therewith and taking lateral support directly on the brake support member by way of said retaining arm disposed at said exit end, the second of said brake shoes on the side of said disc opposite said piston bears laterally against the brake caliper, and the retaining arm arranged in the brake disc's main direction of rotation at the exit is dimensioned in its cross-section such that, during braking, its elastic deformation in a circumferential direction of the brake disc does not exceed the clearance fit between the piston and the bore thereby to avoid transmission of braking forces from said piston onto said brake caliper.

2. The disc brake of claim 1 wherein the bore in the caliper is cylindrical and the piston located therein is also cylindrical.

3. The disc brake of claim 1 wherein the retaining arms are arranged to define a v-type configuration and each of said guide pins are fixed near a radial outer end of each arm.

4. The disc brake of claim 3 wherein the retaining arm at the brake disc exit has a cross-section of a generally rectangular shape.

* * * * *